United States Patent
Casagrande et al.

[11] 3,886,166
[45] May 27, 1975

[54] METHOD FOR THE SYNTHESIS OF (±)-GLAZIOVINE

[75] Inventors: Cesare Casagrande, Como; Luigi Canonica, Milan, both of Italy

[73] Assignee: Siphar S.A., Lugano, Switzerland

[22] Filed: Dec. 19, 1973

[21] Appl. No.: 426,185

[30] Foreign Application Priority Data
Dec. 22, 1972  Switzerland............... 18784/72
Feb. 26, 1973  Switzerland............... 2774/73

[52] U.S. Cl.......... 260/289 R; 204/158 R; 260/152; 260/141; 260/286; 260/288 R; 260/289 A; 424/258
[51] Int. Cl............................................. C07d 35/28
[58] Field of Search...... 260/289, 289 A; 204/158 R

[56] References Cited
OTHER PUBLICATIONS
I Shiwater et al., "Chem. Pharm. Bull. (Japan)" Vol. 17, pp. 1298 & 1299 (1969).
Reiser et al., Trans. of the Faraday Soc., Vol. 64, pp. 1806–1815 (1968).

*Primary Examiner*—Donald G. Daus
*Assistant Examiner*—David B. Springer
*Attorney, Agent, or Firm*—Cushman, Darby & Cushman

[57] ABSTRACT

A method is disclosed for synthesizing (±)-glaziovine, a naturally occurring alkaloid, useful in the therapeutics as an anxiolytic drug. The reaction pattern is the following:

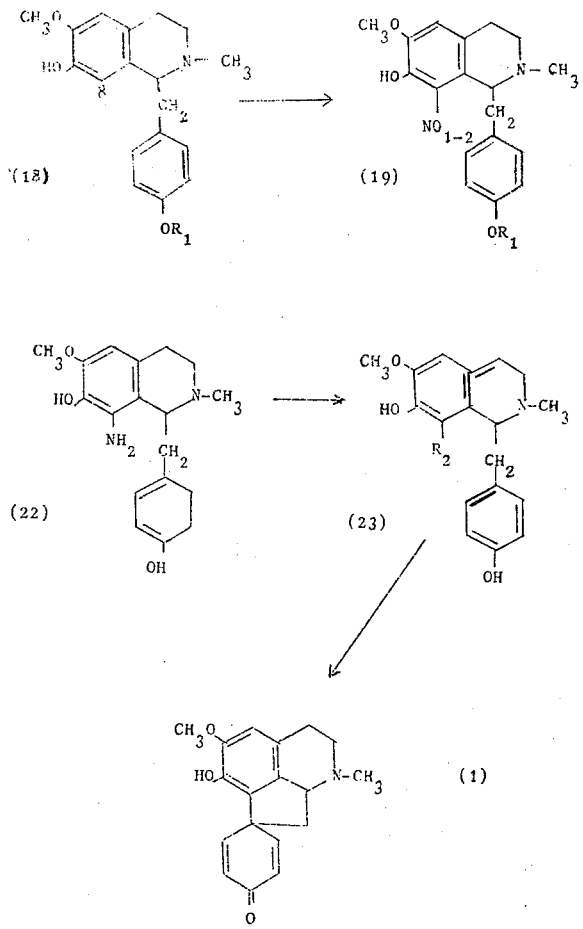

wherein $OR_1$ is an ether or ester group, and $R_2$ is a diazo group. Several variants are provided for the different stages of the method and hydrogenation with catalysts and irradiation with visible and UV radiations are employed for preparing certain intermediates and for carrying out the final stage of the method.

11 Claims, No Drawings

METHOD FOR THE SYNTHESIS OF (±)GLAZIOVINE

Glaziovine, a proaporphinic alkaloid corresponding to the formula (1), has been isolated heretofore from the leaves of a Brazilian Lauracea, *Ocotea glaziovii*.

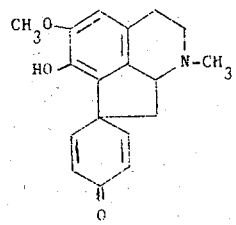

(1)

The thusly obtained glaziovine is formed by a mixture, in variable proportions, of (−)-glaziovine and (±)-glaziovine (G. Ferrari, C. Casagrande, Il Farmaco, Ed. Sci., 25, 449 (1970)). The latter is endowed with considerable pharmacological properties which suggest it as a useful tranquilizer and anti-anxiety drug, devoid of detrimental side effects and, more particularly, deprived of depressive effects (E. Gandini-Collodel, Boll. Soc. Med. Chir. Pisa, 36, 1185 (1968)).

While a few attempts of synthesizing (±)-glaziovine have proven to be wholly fruitless, two synthesis methods have permitted that the substance be obtained, but only with small yields, such as to render these methods inappropriate for the manufacture and the exploitation of (±)-glaziovine for therapeutical applications. As a matter of fact, T. Kametani and H. Yagi (J. Chem. Soc. (C), 1967, 2182)) have described the preparation of (±)-glaziovine by oxidation of (±)-N-methylcoclaurine (formula 2) which is considered its biogenetic precursor, with yeilds of 1%.

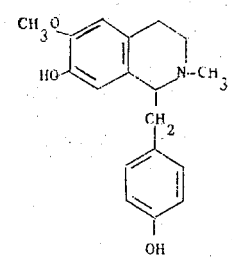

(2)

T. Kametani, S. Shibyua, T. Nakano and K. Fukumoto have described the preparations of (±)-glaziovine according to the following snythesis pattern (J. Chem. Soc. (C), 1971, 3818)):

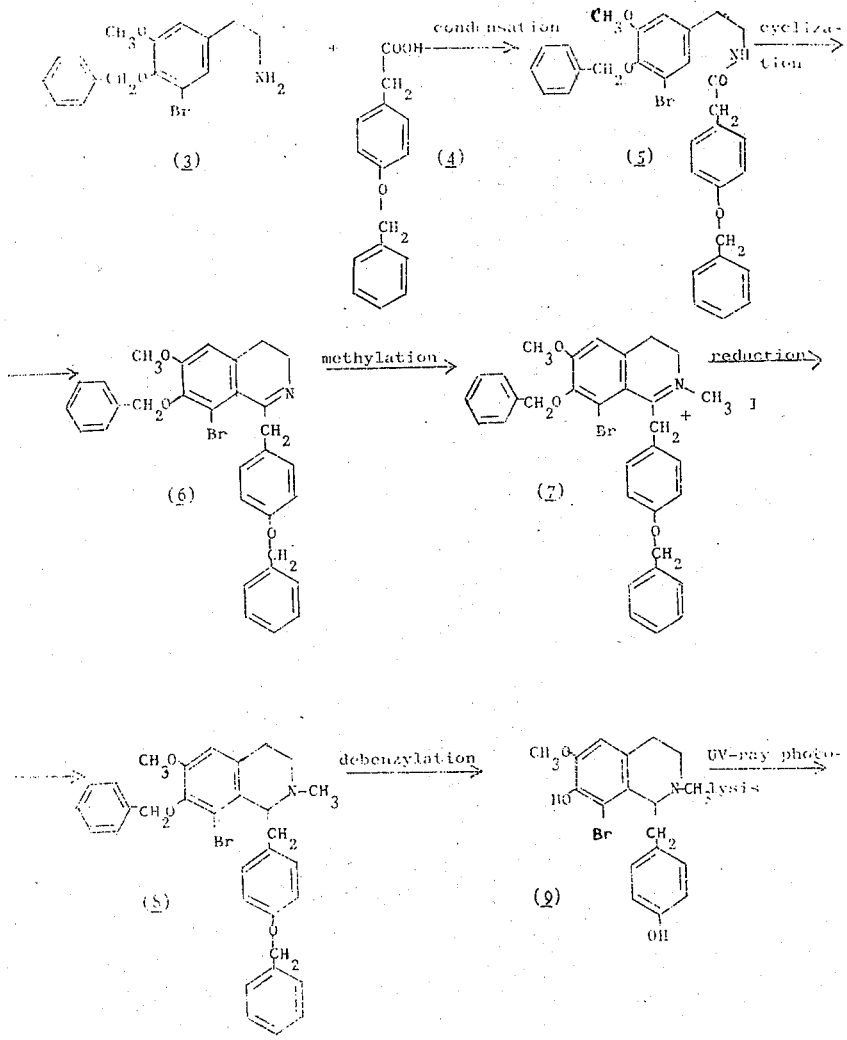

—Continued

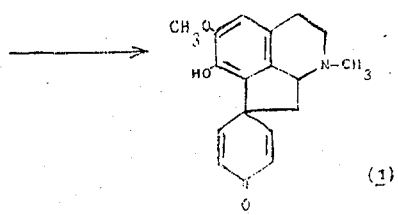

Among the principal defects of this method the following can be enumerated:

1. As a starting product, there is used 3-bromo-4-benzyloxy-5-methoxyphenetylamine (3), a compound which requires, as itself, a synthesis method which is considerably intricate;

2. The yields of the intermediate conversions are low: as a matter of fact an overall yield of 22–20% is indicated for the first four stages, and the debenzylation yield is not reported;

3. Also the yield of the final conversion of 1-(4-hydroxybenzyl)-2-methyl-6-methoxy-7-hydroxy-8-bromo-1,2,3,4-tetrahydroisoquinoline (formula 9) into (±)-glaziovine (1) by irradiation with UV rays is poor; as a matter of fact there has been indicated a yield of 7% for the irradiation in an alkaline solution, and a yield of 10% when the irradiation is carried out in the presence of sodium iodide. Summing up the overall yield of (±)-glaziovine is never above 2.2%.

The literature does not offer any other methods having a practical usefulness for the synthesis of (±)-glaziovine, whereas other methods are known for the preparation of different proaporphinic alkaloids such as pronuciferin, amuronin and homolinearisin.

The preparation of pronuciferin (11) as described by K. Bernauer (Helv. Chim. Acta. 51, 1119, (1968)) provides for a final conversion of 1,2,3,7,8,8a-hexahydro-5,6-dimethoxy-1-methyl-cyclopentyl-isoquinoline-7-carboaldehyde (formula 10) according to the following possible variation patterns:

a. that is, direct conversion (10)–(11) by condensation with methyl-ethinyl ketone (yield 6%);

b. obtention of dihydropronuciferin (12) (yield 39%) and conversion thereof into pronuciferin:
1-directly, with a yield of 14%
2-indirectly by bromination (13) and dehydrobromination with respective yields of 27 and 60%.

The preparation of homolinearisin (14) is described amongst others by S. Ishiwata and K. Itakura (Chem. Pharm. Bull., 18, 1841 (1970); idid., 18, 1219 (1970)). The final stage provides for the Pschorr conversion of the 8-amino compound (15) into homolinearisin, by diazotization with a sulphuric acid (5%) solution of sodium nitrite and the decomposition of the diazonium salt with an excess of sodium acetate at room temperature.

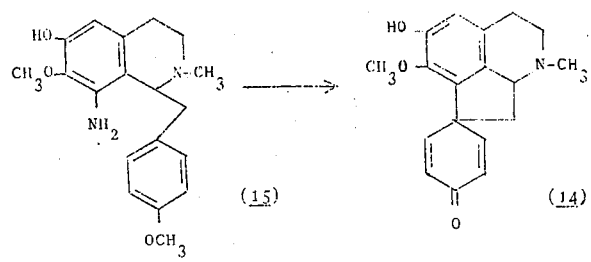

Also this method, in addition to being impaired by a considerable intricacy particularly as regards the obtention of the intermediate (15), has low yields, especially as far as the final stages are concerned.

In addition, it does not appear to be appropriate for the obtention of (±)-glaziovine, due to the differences in the substituents which are present in the aromatic ring of the latter.

An object of the present invention is to provide a convenient method for the preparation of (±)-glaziovine according to the following synthesis pattern:

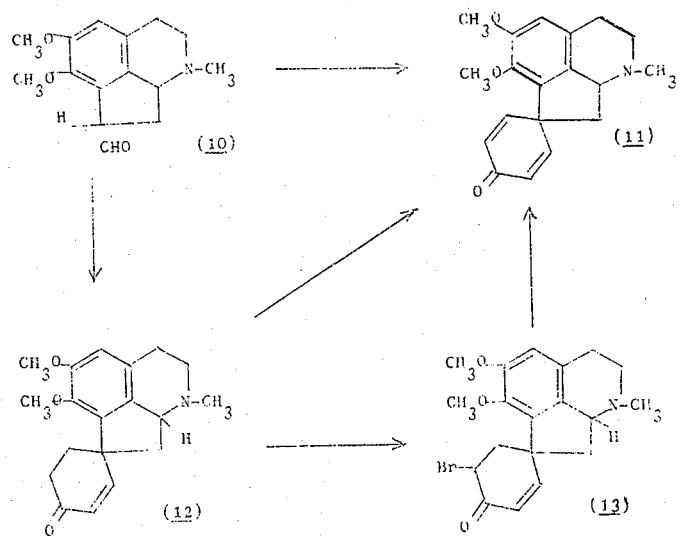

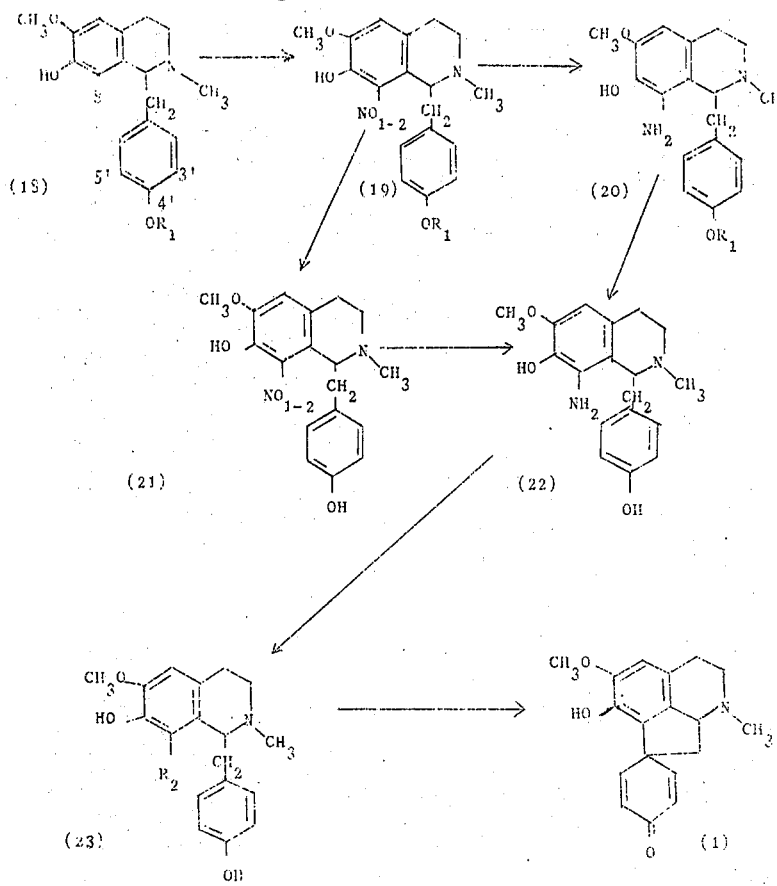

wherein $OR_1$ is an ether or ester group which can be easily split, such as the following ether groups for example:

or analog groups, or the following ester groups: HCOO—, $CH_3COO$—, $CH_3SO_3$—, $C_2H_5O$ COO— or analog groups: in addition the group which is present in the 8-positions of the formulas (19) and (21) can have a single oxygen atom (—NO), thus being a nitroso group, or two oxygen (—$NO_2$), thus being a nitro group, and $R_2$ is one of the following diazo groups $-\overset{+}{N}\equiv N$,

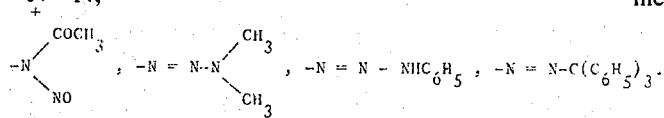

The method the subject of the present invention is defined by the following features:

1. the selective electrophilic substitution in the 8-position of the compounds of formula (18) by reaction with nitrous or nitric acid, or with other nitrating or nitrosation agent, which permits to obtain with high yeilds a derivative having the formula (19) starting from intermediates which are readily available or accessible;

2. the conversion of an 8-nitro compound or an 8-nitroso compound of formula (19) into the 8-amino-4'-hydroxy compound (formula 22) by a two step method, comprising the reduction of the nitro or the nitroso group into an amino group and the removal of the ether or ester group, causing either of the two stages to precede the other one at leisure and going thus one through an intermediate of either formula (20) or formula (21);

3. the possibility of obtaining the formation of the compound of formula (22) as a single-step run starting from the compounds of formula (19) by an appropriate selection of the $R_1$ group; for example, for $R_1$=benzyl, it is possible simultaneously to complete with high yields by catalytic hydrogenation, the reduction of either the nitro or the nitroso group into an amino group together with the hydrogenolysis of the benzyloxy group;

4. the conversion of 1-(pohydroxybenzyl)-2-methyle6-methoxy-7-hydroxy-8-amino-1,2,3,4-tetrahydroisoquinoline into a compound of formula (23) by reaction either with nitrous acid alone or in combination with other reactants and the subsequent conversion of the compounds of formula (23) into (±)-glaziovine by heating in an alkaline solution or, preferably, by irradiation with visible radiations or with UV radiations of the alkaline solutions of compounds of formula (23) at temperatures in the range from 0°C to 25°C. The above suggested photochemical conversion is of particular meaning in that it permits to obtain (±)-glaziovine from the compounds of formula (23) with a considerably higher yield, and thus with a substantial increase in the overall yield of the process.

A specific application of the method the subject of the present invention, as illustrated in the following pattern which is one of the preferred procedures for reducing the invention into practice, provides for the conversion of 1-(p-benzyloxybenzyl)-2-methyl-6-methoxy-7-hydroxy-1,2,3,4-tetrahydroisoquinoline of formula (24)

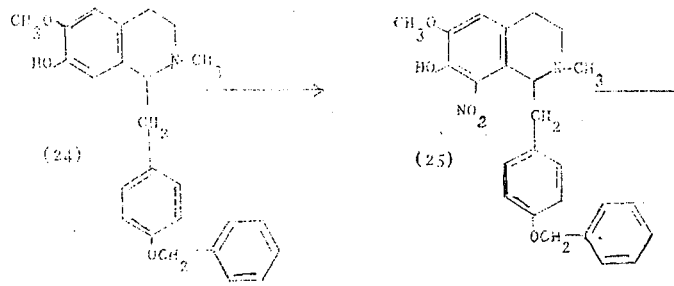

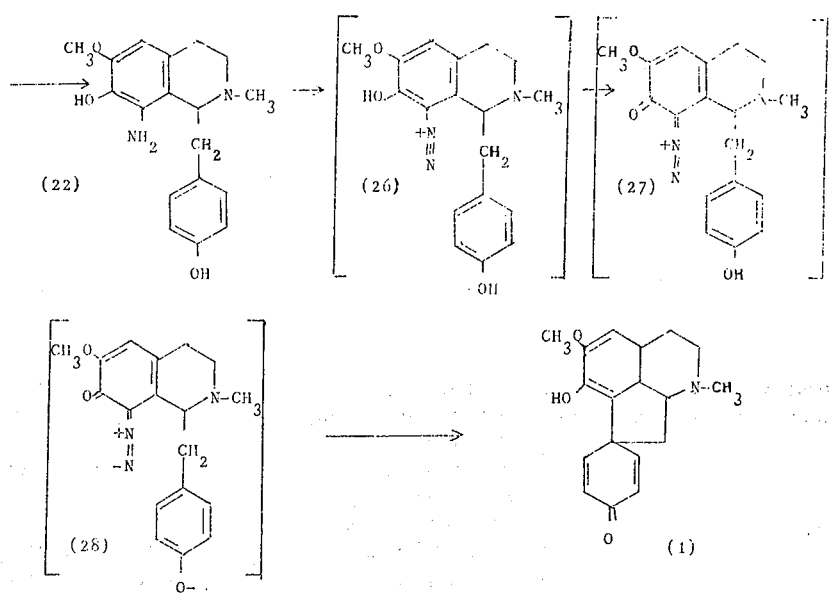

mula (27) precipitates at the outset and is redissolved, in the form of its corresponding phenate of formula (28) by a further addition of an alkaline compound. The solution thus obtained is subjected, in a Pyrex glass apparatus, to visible and ultraviolet radiations as generated by a high-pressure mercury vapor lamp, and in this way the conversion of the diazo-oxide into (±)-glaziovine is achieved with a high photochemical efficiency, with a yield of 45–47% with respect to the employed 8-amino derivative of formula (22).

Irradiation is preferably carried out in a nitrogen atmosphere or another inert gas in an aqueous solution which is made alkaline with either inorganic or organic strong bases which are transparent to the UV radiations (sodium hydroxide, potassium hydroxide, ammonium hydroxide, tetramethylammonium hydrate, and so forth), at temperatures in the range from 0°C to 25°C with diazo-oxide concentrations comprised between 3 and 25 grams per liter of solution.

Another aspect of the present invention, and exactly the above indicated possibility of preparing the intermediates of formula (18) with high yields starting from readily available compounds, is illustrated, for the case of the intermediate having the formula (24) (=formula (18) for

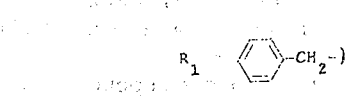

by the following reaction pattern:

into the 8-nitro derivative of formula (25) and with a yield of 83–85% by treating a chloroform solution with diluted nitric acid at temperatures in the range from 10°C to 25°C; the thusly formed nitro compound of formula (25) precipitates from the reaction mixture in the form of a poorly soluble nitrate and is thus protected from further undesirable conversions.

Subsequently, the 1-(p-benzyloxybenzyl)--2-methyl-6-methoxy-7-hydroxy-8-nitro-1,2,3,4-tetrahydroisoquinoline of formula (25) is subjected to catalytic hydrogenation in an appropriate solvent, preferably glacial acetic acid, in the presence of a catalyst based on a metal of the platinum family, preferably palladium on carbon, in order simultaneously to achieve the reduction of the nitro group and the debenzylation; it is thus possible to obtain the 1-(p-hydroxybenzyl)-2-methyl-6-methoxy-7-hydroxy-8-amino-1,2,3,4-tetrahydroisoquinoline of formula (22) with a yield of 93–95%.

The 8-amino compound of formula (22) is converted into its corresponding diazonium derivative of formula (26) by treating its solution in sulphuric acid with sodium nitrite, according to the conventional methods, by alkalization of the solution the diazo-oxide of for-

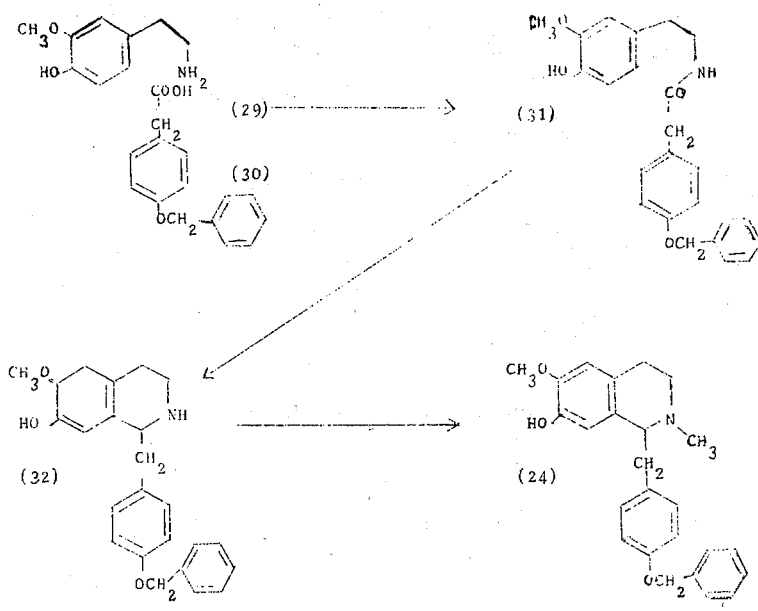

The thermal condensation of p-benzyloxyphenylacetic acid (30) and of 3-methoxy-4-hydroxyphenethylamine (29) permits to obtain, with a yield of 86–92%, the N-(3-methoxy-4-hydroxyphenethyl)-p-benzyloxy-phenylacetamide (31); from this latter, by cyclization according to Bischler-Napieralski with phosphorus oxychloride in acetonitrile, followed by reduction with sodium borohydride, there is obtained with a yield of 75–80% the 1-(p-benzyloxybenzyl)-6-methoxy-7-hydroxy-1,2,3,4-tetrahydroisoquinoline (32), which is methylated with formaldehyde and formic acid giving 1-(p-benzyloxybenzyl)-2-methyl-6-methoxy-7-hydroxy-1,2,3,4-tetrahydroisoquinoline (24) with a yield of 90%. The availability of intermediates of this kind with a high yield and the above indicated favorable features of the final stages of the process permit that (±)-glaziovine may be obtained in a convenient manner. The product can either be extracted or precipitated from the reaction mixtures of the final stage of the synthesis and can subsequently be purified for the pharmaceutical uses either by direct crystallization or by crystallization of one of its salts, or also by chromatography on silica gel, on partially deactivated alumina or on ion-exchange resins according to the routine procedures.

From the ensuing examples, which are given by way of illustration only and are non-limiting, and above all from the results (yields, etc.), it will become clear how the method of the present invention is mainly based on the electrophilic substitution of the first stage and on the photochemical conversion of the 8-substituted derivative of formula (23) into the expected (±)-glaziovine.

The following examples aim at describing in detail the method according to the present invention, without however limiting same.

EXAMPLE 1

A mixture of 870 grams of p-benzyloxyphenylacetic acid, 600 grams of 4-hydroxy-3methoxyphenethylamine and 3 liters of decaline is -methoxyphenethylamine to 160°C in a nitrogen stream with vigorous stirring for 3 hours. Decaline is then evaporated under reduced pressure, the residue is taken up with chloroform and the chloroform solution is washed with diluted hydrochloric acid, then with a solution of sodium bicarbonate and with water, is dried over anhydrous sodium sulphate and evaporated. The residue is crushed with petrol (b.p. 80°–120°C); thus, N-(4-hydroxy-3-methoxyphenethyl)-4-benzyloxyphenylacetamide is obtained with a yield of 88% with a m.p. of 124°–125°C. A solution of 760 grams of this amide in 15 liters of acetonitrile is treated with 1,350 mls of phosphorus oxychloride and heated during 1½ hours to reflux it. The solvent is evaporated under reduced pressures and the residue is taken up with cold water and kept stirred during 30 minutes.

The solid mass, which is then washed with water again, is composed by 1-(p-benzyloxybenzyl)-6-methoxy-7-hydroxy-3,4-dihydroisoquinoline which is used without any further purification in the following stage; the product is dissolved in 10 liters of methanol, the solution is brought to a pH of 8.5 with sodium hydroxide and treated during 30 minutes at 25°C with 180 grams of sodium borohydride. Subsequently the mass is stirred during 60 minutes at 25°C, whereafter the solvent is evaporated under reduced pressure; the residue is taken up with water and extracted with chloroform. The extract is washed with water, dried over anhydrous sodium sulphate and evaporated; the residue is recrystallized from ethyl acetate. Thus, 560 grams (77% of theory) of 1-(4-benzyloxybenzyl)-6-methoxy-7-hydroxy-1,2,3,4-tetrahydroisoquinoline are obtained, with a m.p. of 156°–158°C. This compound (480 grams) is heated to reflux it during 2 hours with 1,150 mls of 85% formic acid and 1,400 mls 34% aqueous formaldehyde; on completion, the solution is evaporated under reduced pressure: the residue taken up with water and the solution is made alkaline at 10°C with ammonium hydroxide. The thusly obtained precipitate is collected on a filter, washed with water, then brought to a boil under stirring with 1.5 liters of alcohol. The mixture is allowed to cool and the precipitate is collected on a filter, thus obtaining 448 grams (yield 90% of theory) of 1-(p-benzyloxybenzyl)-2-methyl-6-methoxy-7-hydroxy-1,2,3,4-tetrahydroisoquinoline having an m.p. of 136°–138°C.

EXAMPLE 2

A solution of 600 grams of 1-(p-benzyloxybenzyl)-2-methyl-6-methoxy-7-hydroxy-1,2,3,4-tetrahydroisoquinoline in 3 liters of chloroform is supplemented with vigorous stirring at 25°–30°C with a mixture of 266 mls 65% nitric acid and 850 mls water, then 3 grams of sodium nitrite. Stirring is continued during 90 minutes at 30°C. On completion, the 1-(p-benzyloxybenzyl)-2-methyl-6-methoxy-7-hydroxy-8-nitro-1,2,3,4-tetrahydroisoquinoline nitrate is allowed to cool and collected on a filter, washing in the cold with chloroform and then with water. The thusly obtained nitrate is dissolved into 1.5 liters of methanol, the solution is made alkaline to a pH of 8.5 with ammonium hydroxide. The as-formed precipitate is collected on a filter obtaining 565 grams (84% of theory) of 1-(p-benzyloxybenzyl)-2-methyl-6-methoxy-7-hydroxy-8-nitro-1,2,3,4-tetrahydroisoquinoline having an m.p. of 190°–191°C.

EXAMPLE 3

A solution of 500 grams of 1-(p-benzyloxybenzyl)-2-methyl-6-methoxy-7-hydroxy-8-nitro-1,2,3,4-tetrahydroisoquinoline in 2.5 liters of glacial acetic acid is hydrogenated during 12 hours under a pressure of 3–4 kilograms per sq. centimeter in the presence of 100 grams of 5% palladium on carbon. The catalyst is filtered off, the solvent is evaporated under reduced pressure, the residue is taken up with water and the solution is made alkaline (pH 9) with ammonium hydroxide. The precipitate is collected on a filter, thus obtaining 338 grams (94% of theory) of 1-(p-hydroxybenzyl)-2-methyl-6-methoxy-7-hydroxy-8-amino-1,2,3,4-tetrahydroisoquinoline, having an m.p. of 212°–213°C.

EXAMPLE 4

A solution of 94.2 grams of 1-(p-hydroxybenzyl)-2-methyl-6-methoxy-7-hydroxy-8-amino-1,2,3,4-tetrahydroisoquinoline in 3 liters of 1N sulphuric acid is supplemented, with stirring, between 0°C and 5°C, with 21 grams of sodium nitrite. The diazonium sulphate solution thus obtained is made alkaline with 2.5 liters of 2N sodium hydroxide: the diazo-oxide which is separated at the outset as a yellow precipitate is redissolved by the excess alkali, the solution is diluted to 10 liters with deaerated water and subjected, in a nitrogen atmosphere at 15°C in a Pyrex glass apparatus, to the radiations of a 2,000 W high-pressure mercury vapor lamp until the yellow hue is discharged (about 30–40 mins.). The solution is brought to a pH of 8.6 with hydrochloric acid and is stirred with 1.5 liters of chloroform. The two phases are filtered, the chloroform is separated and the aqueous phase is extracted four times with 1.5 liters of chloroform. The extracts are evaporated under reduced pressure to a small volume and percolated through a chromatographic column containing 1.3 kilograms of neutral alumina (activity rating IV of the Brockmann scale). The column is then further eluted with chloroform. The eluates are evaporated under reduced pressure and the residue is recrystallized from ethyl acetate. There are thus obtained 40.2 grams (yield 45% of theory) of pure (±)-glaziovine, having an m.p. of 220°–222°C.

EXAMPLE 5

By adopting the same procedure as in Example 4, but heating the solution to 70°C during 30 minutes rather than subjecting it to irradiation, (±)-glaziovine is obtained with a yield of 24%.

The embodiments of the invention to which an exclusive property or privilege is claimed are defined as follows:

1. A method for the synthesis of (±)-glaziovine having the formula

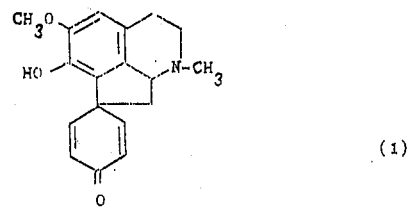

which provides for the following reaction pattern:

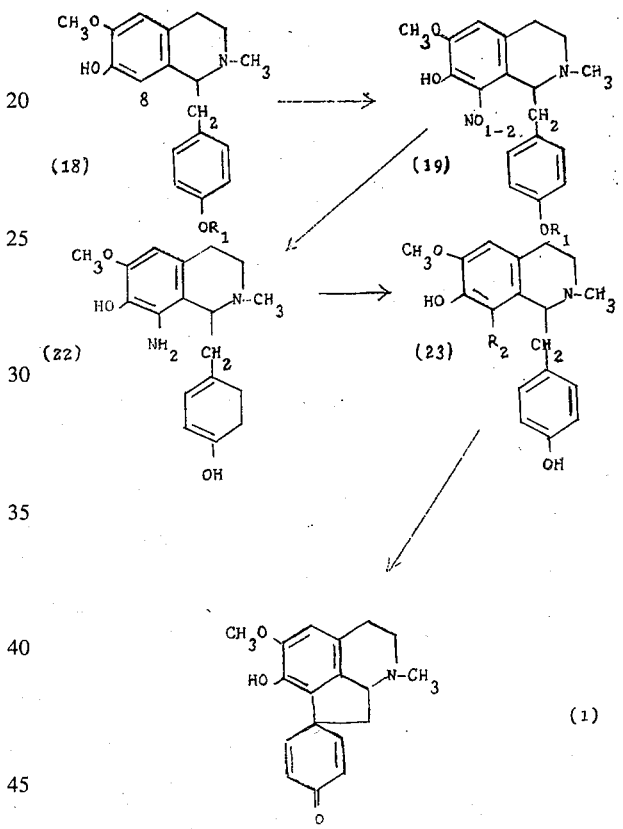

wherein $OR_1$ is an ether or ester group which can easily be split, such as for example the following ether groups:

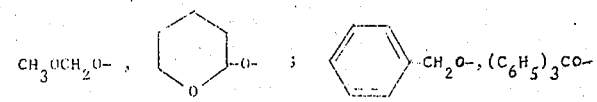

or analog groups, or the following ester groups: HCCOO—; $CH_3COO$—; $CH_3SO_3$—; $C_2H_5O\ COO$— or analog groups; in addition the group which is present in the 8-position of formula (19) can have either a single oxygen atom (—NO), thus representing a nitroso group, or two oxygen atoms (—$NO_2$), thus representing a nitro group, and $R_2$ is one of the following diazo groups:

—NN,

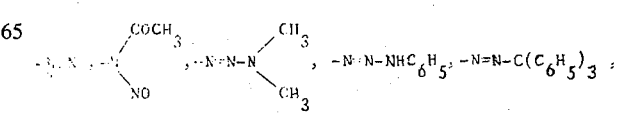

—N=N—NHC₆H₅, —N=N—C(C₆H₅)₃,
characterized by comprising the steps of:
   a. subjecting either to nitration or nitrosation with either nitrous or nitric acid, respectively, or a derivative thereof, a 4'-O-ether or ester of 1-(p-hydroxybenzyl)-2-methyl-6-methoxy-7-hydroxy-1,2,3,4-tetrahydroisoquinoline of formula (18) selectively to obtain an 8-nitroso-, or an 8-nitro-derivative of formula (19);
   b. converting said compound of formula (19) into its corresponding 8-amino-4'-hydroxy compound of formula (22) by reduction of either the nitroso or the nitro group to an amino group and removing the ether or ester group;
   c. subjecting to reaction with nitrous acid the compound of formula (22) with the conventional methods in the art to obtain the compound of formula (23);
   d. converting the compound of formula (23) into (±)-glaziovine.

2. A method according to claim 1, characterized in that the conversion (b) from the compound of formula (19) to the compound of formula (22) takes place by a first reduction stage in which the compound of formula (19) is converted into the compound having the formula (20)

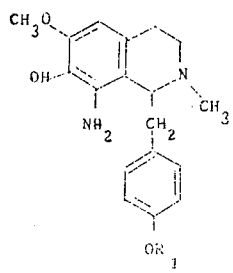

(20)

and subsequent stage of removal of the ether group or ester group which is present in the 4'-position.

3. A method according to claim 1, characterized in that the conversion (b) takes place by a first stage of removal of the ether or ester group which is present in the 4'-position, with the formation of the compound of formula (21)

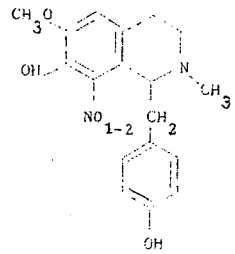

(21)

and subsequent reduction of either the nitroso or nitro group which is present in the 8-position into an amino group.

4. A method according to claim 1, characterized in that, when

the conversion (b) takes place in a single step by catalytic hydrogenation which originates the reduction of either the 8-nitroso or the 8-nitro group to an amino group and the simultaneous hydrogenolysis of the 4'-benzyloxy group.

5. A method according to claim 4, characterized in that the 1-(p-benzyloxybenzyl)-2-methyl-6-methoxy-7-hydroxy-1,2,3,4-tetrahydroisoquinoline of formula

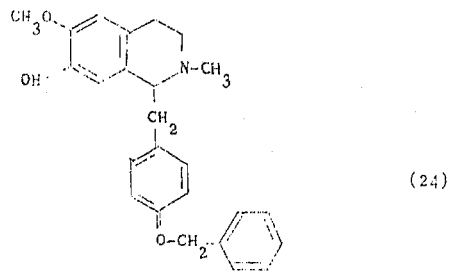

(24)

is converted (stage a) into the 8-nitro derivative of formula

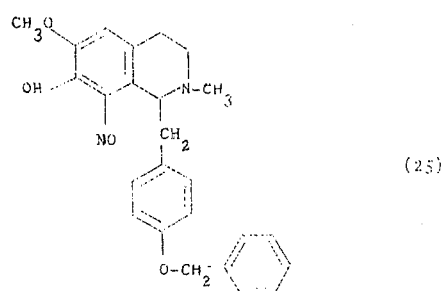

(25)

by reaction with nitric acid and the 8-nitro derivative (25) is subjected to catalytic hydrogenation in the presence of an appropriate catalyst, more particularly a metal of the platinum family in the pure or supported state, the result being the obtention of the compound of formula (22).

6. A method according to claim 5, characterized in that the catalytic hydrogenation is carried out in glacial acetic acid in the presence of 10% palladium on carbon at a temperature comprised between 15°C and 40°C and under a hydrogen pressure of from 1 to 10 kilograms per square centimeter.

7. A method according to claim 1, characterized in that the amino compound of formula (22) is treated in an acidic solution at 0°–5°C with an equivalent amount of an alkali metal nitrite, with the formation of the corresponding diazonium salt of formula (23), wherein $R_2$ = $-N \equiv N-$.

8. A method according to claim 1, characterized in that the 1-(p-benzyloxybenzyl)-2-methyl-6-methoxy-7-hydroxy-1,2,3,4-tetrahydroisoquinoline of formula (24) is converted into the 1-(p-hydroxybenzyl)-2-methyl-6-methoxy-7-hydroxy-8-amino-1,2,3,4-tetrahydroisoquinoline of formula (22) by reaction with nitric acid and attendant formation of the 8-nitro compound of formula (25) followed by a catalytic hydrogenation in the presence of a metal of the platinum group in the pure state or on an appropriate support, such as 10% palladium on carbon, and in that said hydrogenation concurrently originates the reduction of the nitro group into an amino group and the splitting of the benzyloxy group, and in that the 8-amino compound of formula (22) is converted into the corresponding diazonium salt by reaction with nitrous acid at 0°–5°C in an acidic solution.

9. A method according to claim 1, characterized in that the conversion of the compound (23) into (±)- glaziovine of formula (1) takes place by irradiation in an alkaline solution with radiations comprised in the field from the visible to the untraviolet of the spectrum.

10. A method according to claims 1 and 8, characterized in that the diazonium salt is directly converted into (±)-glaziovine by alkalization of the acidic solution and subsequent irradiation with either visible or ultraviolet radiations of the thusly obtained alkaline solution.

11. A method according to claim 8, characterized in that 1-(p-benzyloxybenzyl)-2-methyl-6-methoxy-7-hydroxy-1,2,3,4-tetrahydroisoquinoline (24) is prepared by thermal condensation of p-benzyloxyphenylacetic acid (30) with 3-methoxy-4-hydroxyphenethylamine (29) to obtain N-(3-methoxy-4-hydroxyphenethyl)-p-benzyloxyphenylacetamide (31), which, by cyclization according to Bischler-Napieralski with phosphorous oxychloride in acetonitrile, followed by reduction with sodium borohydride gives 1-(p-benzyloxybenzyl)-6-methoxy-7-hydroxy-1,2,3,4-tetrahydroisoquinoline (32), the latter being further methylated with formaldehyde and formic acid to obtain the compound (24).

\* \* \* \* \*